United States Patent [19]

Tsuji

[11] Patent Number: 4,974,009
[45] Date of Patent: Nov. 27, 1990

[54] FOCUS DETECTING DEVICE AND PHOTOGRAHING APPARATUS PROVIDED WITH THE SAME

[75] Inventor: Sadahiko Tsuji, Yokohama, Japan

[73] Assignee: Canon Kabushiki Kaisha, Tokyo, Japan

[21] Appl. No.: 425,349

[22] Filed: Oct. 20, 1989

Related U.S. Application Data

[63] Continuation of Ser. No. 204,969, Jun. 8, 1988, abandoned, which is a continuation of Ser. No. 829,939, Feb. 18, 1986, abandoned.

[30] Foreign Application Priority Data

Feb. 19, 1985 [JP] Japan .................................. 60-31033

[51] Int. Cl.$^5$ .............................................. G03B 3/10
[52] U.S. Cl. ...................................... 354/403; 354/404
[58] Field of Search ........................ 354/403, 404, 405

[56] References Cited

U.S. PATENT DOCUMENTS

| 4,104,517 | 8/1978 | Mesch et al. | 354/405 X |
| 4,123,650 | 10/1978 | Hosoe et al. | 354/405 X |
| 4,147,417 | 4/1979 | Mandler | 354/404 |
| 4,230,400 | 10/1980 | Wick et al. | 354/404 X |
| 4,417,795 | 11/1983 | Tamura et al. | 354/404 |
| 4,550,995 | 11/1985 | Toyama | 354/403 |
| 4,641,022 | 2/1987 | Suzuki | 354/404 X |

Primary Examiner—Michael L. Gellner
Attorney, Agent, or Firm—Fitzpatrick, Cella, Harper & Scinto

[57] ABSTRACT

A focus detecting device and a photographic apparatus provided with such a device has an apparatus for setting optic axes thereof with a base length therebetween, and for photoelectrically detecting a focus state thereof, at least one of the optic axes being bent, or reflected, by a fixed reflecting surface, and a focus detection component disposed along the bent optic axis and movable, during a focus detection operation, in a direction intersecting the bent axis.

15 Claims, 3 Drawing Sheets

FOCUS DETECTING DEVICE AND PHOTOGRAHING APPARATUS PROVIDED WITH THE SAME

This application is a continuation of application Ser. No. 204,969 filed June 8, 1988, now abandoned, which is a continuation of application Ser. No. 829,939 filed Feb. 18, 1986, now abandoned.

BACKGROUND OF THE INVENTION

1. Field of the Invention

This invention relates to a photoelectric focus detecting device of which the driving mechanism can be simplified and to a photographing apparatus provided with such device.

2. Related Background Art

Photographic cameras and video cameras having an automatic focus detecting device incorporated therein are commonplace, and such focus detecting device is mounted on a camera body or is incorporated in an interchangeable lens. On the other hand, the tendency of cameras and lenses toward compactness is well known and along therewith, it is required to make the detecting device compact and simplify the driving mechanism thereof.

As is well known, the automatic focus detecting system is broadly divided into the passive type and the active type. In a typical system of the passive type, photosensor arrays are disposed on two optic axes, respectively, and the correlation between an image signal obtained by driving a pivotable mirror provided on one of the optic axes and scanning the array thereon by the image of an object or by electrically scanning the array and other image signal is taken and the object distance is detected from the scanning angle thereof or the scanning distance thereof. Also, in a system of the active type, an invisible light or the like is projected from one lens side onto an object and the reflected light from the object is received by the remaining lens and directed to a photoelectric element, and in that case, at least one of a light source, a photoelectric element, a projecting lens and a light-receiving lens is moved and scanned.

In both of these types, except a few examples in which the array is electrically scanned, some driving mechanism is required and moreover, reciprocal pivotal movement and movement in a direction perpendicular to the photographing optic axis are effected and therefore, converting means such as a cam or an encoder need be provided in a connecting structure for connecting the movement of those movable elements and the movement of the focusing lens of the photo-taking optical system in the direction of the optic axis. Such connecting structure is liable to cause a reduction in accuracy.

SUMMARY OF THE INVENTION

It is a first object of the present invention to simplify the driving mechanism of a focus detecting device of the active type or the passive type and in particular, to provide a construction which can simplify a mechanism for driving the component of the focus detecting device such as a projection light source, a photoelectric converting element or a converging lens.

It is a second object of the present invention to simplify the construction for harmonizing the operation of the focus driving mechanism of an optical apparatus performing the original function, such as photographing apparatus, and the operation of the driving mechanism of a focus detecting device.

DESCRIPTION OF THE PREFERRED EMBODIMENTS

Figure 1:
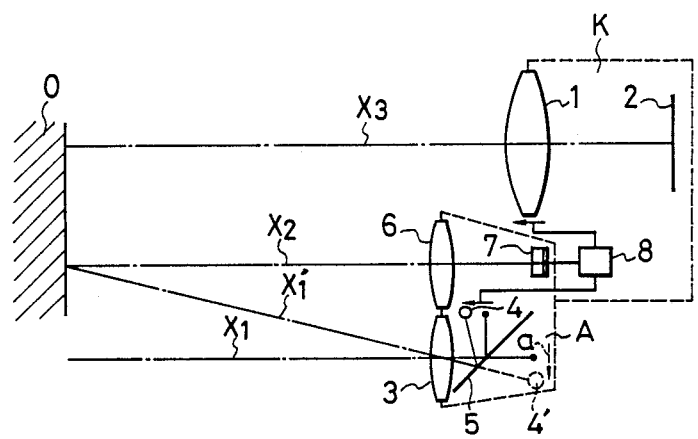
FIG. 1 is an optical arrangement illustration showing an embodiment of the present invention.

FIG. 1 shows an embodiment of the present invention. This Figure is depicted with the distance between an object to be photographed and the apparatus being greatly shortened. In FIG. 1, reference character 0 designates an object, reference numeral 1 denotes the photo-taking lens of the photographing apparatus K, and reference numeral 2 designates an image pickup surface which is the surface of a photographic film or the light-receiving surface of a video image pickup element. Letter A denotes a focus detecting device, reference numeral 3 designates a projecting lens, and reference numeral 4 denotes a projection light source which may preferably be an LED emitting an invisible light, for example, infrared light. The projection light source 4 lies on the focal plane of the projecting lens 3. Reference numeral 5 designates a total reflection mirror for bending the projection optic axis X1 at a right angle. However, the projection light source 4 not only moves in a direction orthogonal to the optic axis, but also finely moves in the direction of the optic axis to absorb blur. Accordingly, in the case of precise measurement, the optic axis may be bent at an angle somewhat greater than a right angle and the amount of movement in the direction of the optic axis may be approximated. Reference numeral 4' designates the mirror image of the projection light source 4, and this also corresponds to the projection light source of the conventional apparatus.

In the present embodiment, the introduction of the total reflection mirror 5 enables the projection light source 4 to be disposed at the bent position of the optic axis X1 of the projecting lens 3 and as a result, it has become possible to move the projection light source 4 in the same direction as the direction of movement of the photo-taking lens 1, in contrast with the conventional apparatus in which the light source 4' was moved in the direction of broken line arrow a. That is, in the past, a mechanism for moving the light source in a direction perpendicular to the direction of movement of the photo-taking lens was necessary, whereas in the present embodiment, a mechanism for moving the light source in the same direction as the direction of movement of the photo-taking lens is only required.

Reference numeral 6 designates a light-receiving lens provided at a distance equal to the base length, and reference numeral 7 denotes a photoelectric element provided with a light-receiving area vertically divided into two as viewed in FIG. 1 with the optic axis X2 as the boundary. It is to be understood that the photoelectric element 7 lies on the focal plane of the light-receiving lens 6. Reference numeral 8 designates a device for processing the output signal of the photoelectric element 7 and driving the lens.

In the above-described construction, the infrared detecting light emitted from the projection light source 4 is projected toward the object 0, and as the projection light source 4 is moved from the optic axis X1 in a direction perpendicular thereto, the projection optic axis becomes inclined as indicated by X1' and intersects the optic axis X2 of the light-receiving lens 6 on the object 0. That is, at this time, the detecting light reflected by the object 0 is imaged by the light-receiving lens 6 and enters the two light-receiving areas of the photoelectric element 7 in equal quantities, an in-focus state is judged, and the photo-taking lens 1 axially moved at the same time is stopped.

In the above-described embodiment, the directions of movement of the projection light source and the photo-taking lens are coincident with each other and therefore, the mechanical structure becomes simplified and compact, but if a construction in which the two are moved together is adopted, means for mediating the difference between the amounts of movement of the two will become unnecessary.

Description will hereinafter be made of the fact that integral movement is possible in the optical principle.

Figure 2:
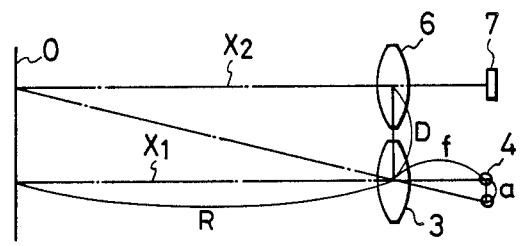
FIGS. 2 and 3 illustrate the optical action.

FIG. 2 shows a form in which the focus detecting device provided with the projecting lens 3, the projection light source 4, the light-receiving lens 6 and the photoelectric element 7, but without the total reflection mirror 5, is developed along the optical axis. If the distance between the projection optic axis X1 and the light-receiving optic axis X2, i.e., the base length is D and the distance from the projecting lens to the object is R and the focal length of the projecting lens is f and the scanning distance from the infinity state of the projection light source to the in-focus state is a, the following expression can be made from a geometric similarity relation:

$$R/D = f/a.$$

Thus, this can be modified into:

$$a = D \cdot f / R$$

Figure 3:
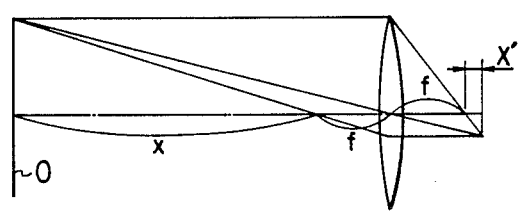

Also, generally, if the distance from the forward focus of the lens depicted in FIG. 3 to the object to be photographed is x and the distance from the rearward focus of the lens to the image point is x' and the focal length of the lens is f, there is a relation that $$xx' = -f^2$$

(Newton's equation).

The amount of axial movement of the lines for focusing is $-x'$ and therefore, if the above-mentioned amount of movement a of the projection light source can be made coincident with the amount of axial movement $-x'$, integral scanning will become possible.

Accordingly, if the focal length of the focusing lens of the photo-taking system, for example, a component lens of the entire lens or the single lens, or the focusing lens of a zoom lens, is $f_F$, $$x' = -f^2_F/x,$$

where x is the distance from the forward focus of the lens to the object, and if the forward focus position of the focusing lens is made coincident with the principal point position of the projecting lens, $x = R$. Also, even in a case where they are not made coincident with each other from the problem of disposition or the problem of appearance design, if the distance is sufficiently long like an object in the normal photographing area, $$x > > f_F$$

and even if x is regarded as $x = R$, the accuracy of distance measurement can be sufficiently ensured.

Accordingly, in order that $a = x'$, $D \cdot f$ is determined as per the following equation:

$$D \cdot f = f^2_F.$$

To further ensure the accuracy, the relation among D, f and $f_F$ may be determined so that $a = x'$ between infinity and the photographing close distance.

Figure 4:
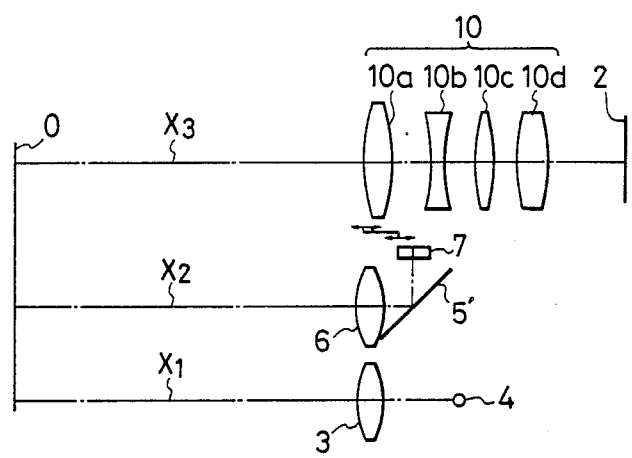
FIGS. 4 and 5 are optical arrangement illustrations showing further embodiments of the present invention.

FIG. 4 shows a second embodiment which is of the type scanning a photoelectric element instead of a projection source. In FIG. 4, components similar to those in FIG. 1 are given similar reference numerals.

In the present embodiment, a projection light source 4 is fixed on the optic axis X1 of a projecting lens 3, while the optic axis X2 of a light-receiving lens 6 is bent substantially at a right angle by the reflecting surface of a mirror 5' and a photoelectric element 7 is disposed on the focal plane of the light-receiving lens 6. Reference numeral 10 designates a zoom lens comprising a focusing lens 10a, a variator 10b, a compensator 10c and a relay lens 10d. The focusing lens 10a is moved in the direction of the optic axis for focus adjustment, and the photoelectric element 7 is also moved in the direction of the optic axis of the zoom lens with the focusing lens 10a.

Figure 5:
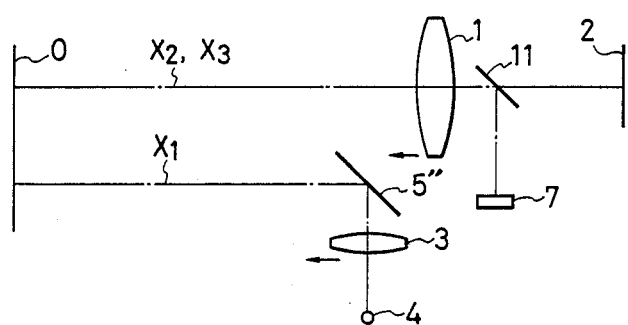
Figure 6:
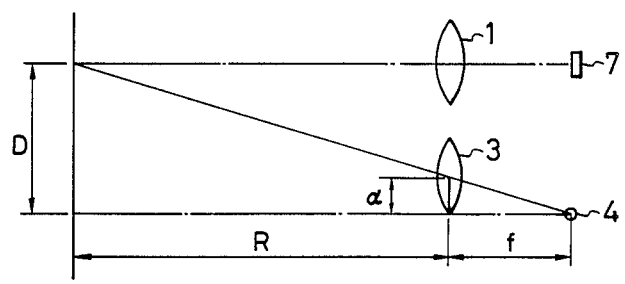
FIG. 6 illustrates the optical action.

FIG. 5 shows still another embodiment in which a projection light source 4 and a photoelectric element 7 are fixed and instead, a projecting lens 3 or a light receiving lens (in the present embodiment, the projecting lens 3) is scanned. One of the projection optic axis and the light-receiving optic axis (in the present embodiment, the light-receiving optic axis X2) is made coincident with the photographing optic axis X3. The projection optic axis X1 is bent by a reflecting mirror 5" at a position more adjacent to the object side than the projecting lens 3, and the projecting lens 3 is moved by the same amount as the amount of movement of a phototaking lens 1 in a direction orthogonal to the optic axis X1, i.e., the direction of the photographing optic axis X3. Reference numeral 11 designates a half-mirror obliquely disposed on the optic axis X3, and the photoelectric element 7 is disposed on the branched-off optic axis and receives a reflected light imaged by the photo-taking lens 1. At this time, $a = D \cdot f(R - f)$. See FIG. 6. Approximately, if $R > > f$, $D \cdot f = f^2_F$. To further enhance the accuracy, the relation among D, f and $f_F$ may be determined so that $a = x'$ between infinity and the close photographing distance.

As described above, the projecting lens or the light-receiving lens may be scanned instead of the projection light source or the photoelectric element being scanned. Also, one of the projection optic axis and the light-receiving optic axis may be made coincident with the optic axis of the photo-taking system, or may be disposed through the photo-taking system but with the optic axis being deviated.

Figure 7:
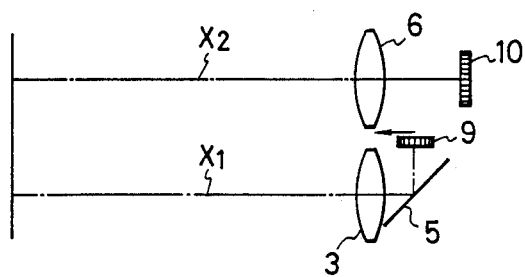
FIGS. 7 and 8 are optical arrangement illustrations showing still further embodiments of the present invention.

The above-described embodiments are ones applied to the active type, but they can also be applied to the passive type. In FIG. 7, reference numerals 9 and 10 designate photosensor arrays. It is to be understood that the array 9 is movable with a photo-taking lens, not shown, and the array 10 is stationary. Thus, the array 9 scans the object field, and the correlation between the image signals from the two arrays 9 and 10 is taken and an in-focus state is determined. When scanning is to be effected by the photo-taking lens, the focusing lens is moved, but instead, a holding member for an image pickup surface 2 may be moved.

Figure 8:
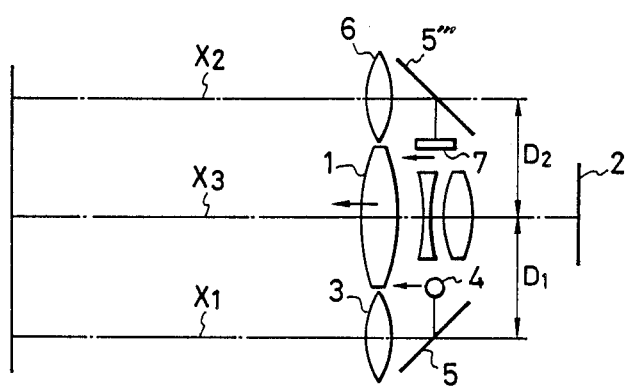

FIG. 8 shows yet still another embodiment which is of the type in which both of the projecting side and the light-receiving side are scanned to eliminate parallax.

In the present embodiment, the projection optic axis X1 and the light-receiving optic axis X2 are bent in opposite directions by reflecting mirrors 5 and 5''', respectively, and a projection light source 4 and a photoelectric element 7 disposed on the optic axis are moved in the same direction as a photo-taking lens 1.

Again in this case, the amounts of movement of the photo-taking lens 1, the projection light source 4 and the photoelectric element 7 can be made equal to one another, and if the spacing between the photographing optic axis X3 and the projection optic axis X1 is D1 and the spacing between the photographing optic axis X3 and the light-receiving optic axis X2 is D2, the focal length $f_1$ of the projecting lens and the focal length $f_2$ of the light-receiving lens may be determined so as to satisfy $D1 f_1 = f^2_F$ and $D2 f_2 = f^2_F$ which correspond to the result of the development of the aforementioned equation.

In the present invention described above with respect to the preferred embodiments thereof, the direction of movement of the focusing system and the direction of movement of the components of the focus detecting device can be made identical to each other and therefore, the interlocking mechanism is simplified and made compact, and this greatly contributes to the compactness of the photographing apparatus, the prevention of troubles and the ease of manufacture and assembly. Further, if the amounts of movement of the focusing system and the components are made equal to each other, means for controlling the amount of movement such as a cam or a lever can be eliminated, and this leads not only to the ease of manufacture but also to the possibility of eliminating all error factors including back-lash that have necessarily existed in the adjusting means, which also leads to a very excellent effect that the accuracy of focusing can be improved.

I claim:
1. A focus detecting device for detecting the focus state of an imaging device with respect to an object, said imaging device having an imaging lens movable in a direction toward the object, comprising:
   means for guiding light reflected from the object along first and second optic axes with a base length therebetween;
   means for photoelectrically detecting said focus state;
   a fixed reflecting surface for bending said first optic axis;
   a component for focus detection disposed along the bent optic axis and movable in the same direction as said imaging lens, said focus detection component being movable during a focus detection operation; and
   a second component for focus detection disposed along the second optic axis, said second focus detection component cooperating with said focus detection component to detect information representing the distance to the object.

2. A focus detecting device according to claim 1, wherein said component for focus detection is one of a projection light source, a light-receiving photoelectric element and a converging lens.

3. A focus detecting device according to claim 1, wherein said optic axis is bent at an angle deviated from a right angle.

4. A focus detecting device according to claim 1, wherein both of said optic axes are bent by the reflecting surface.

5. A photographing apparatus having an imaging lens movable in a direction toward an object to be photographed and provided with a focus detecting device, comprising;
   means for guiding light reflected from the object along first and second optic axes with a base length therebetween;
   means for photoelectrically detecting a focus state of the object;
   a fixed reflecting surface for bending said first optic axis;
   a component for focus detection disposed along the bent optic axis and movable in the same direction as the direction of movement of said imaging lens, said focus detection component being movable during a focus detection operation; and
   a second component for focus detection disposed along the second optic axis, said second focus detection component cooperating with said focus detection component to detect information representing the distance to the object.

6. A photographing apparatus according to claim 5, wherein said imaging lens is a focusing lens, and wherein said focusing lens and said component for focus detection are moved together.

7. A photographing apparatus according to claim 6, wherein a converging lens is disposed along said bent optic axis, and wherein the product of the focal length of said converging lens and the length of the base line is substantially equal to the square of the focal length of said focusing lens.

8. A photographing apparatus according to claim 5, wherein one of said optic axes is the optic axis of a imaging lens of said photographing apparatus.

9. A focus detecting device for detecting the focus state of an optical system with respect to an object, said optical system having an imaging lens movable in a direction toward the object, comprising:
   first optical means having a first lens and first electrical means and also having a first optical path;
   second optical means having a second lens and second electrical means and also having a second optical path offset by a predetermined amount from said first optical path;
   fixed optical path bending means for bending said first optical path; and
   moving means for moving one of said first lens and said first electrical means in the same direction as the imaging lens, said movement occurring during a focus detection operation;
   wherein said first electrical means cooperate with said second electrical means to detect information representing the distance to the object.

10. A focus detecting device according to claim 9, wherein said first electrical means is a light source for emitting a focus detecting light, and said second electrical means is photoelectric converting means for receiving the focus detecting light reflected by an object.

11. A focus detecting device according to claim 10, wherein said light source is an infrared light emitting.

12. A focus detecting device according to claim 9, wherein said second electrical means is a light source for emitting a focus detecting light, and said first electrical means is photoelectric converting means for receiving the focus detecting light reflected by an object.

13. A focus detecting device according to claim 12, wherein said light source is an infrared light emitting LED.

14. A focus detecting device according to claim 9, wherein said first and second electrical means are photoelectric converting means for receiving radiation from an object.

15. A focus detecting device according to claim 9, further comprising;
   second optical path bending means for bending said second optical path; and
   second moving means for moving one of said second lens and said second electrical means in a direction intersecting the second bent optical path.

* * * * *

UNITED STATES PATENT AND TRADEMARK OFFICE
CERTIFICATE OF CORRECTION

PATENT NO. : 4,974,009
DATED : November 27, 1990
INVENTOR(S) : Sadahiko TSUJI

It is certified that error appears in the above-identified patent and that said Letters Patent is hereby corrected as shown below:

Title page: Item (54) :

Line 1, "PHOTOGRAHING" should read --PHOTOGRAPHING--.

COLUMN 6:

Line 16, "comprising;" should read --comprising:--.

COLUMN 7:

Line 4, "light emitting." should read --light emitting LED.--.

COLUMN 8:

Line 6, "comprising;" should read --comprising:--

Signed and Sealed this

Twenty-first Day of July, 1992

Attest:

DOUGLAS B. COMER

*Attesting Officer*  *Acting Commissioner of Patents and Trademarks*